US012683789B1

(12) United States Patent
Rechtschaffen et al.

(10) Patent No.: US 12,683,789 B1
(45) Date of Patent: Jul. 14, 2026

(54) DECENTRALIZED VALIDATION OF AI-GENERATED RESPONSES VIA BLOCKCHAIN-BASED CONSENSUS

(71) Applicant: Ramsee 1 LLC, New York, NY (US)

(72) Inventors: Alan Rechtschaffen, New York, NY (US); Miera Rechtschaffen, New York, NY (US)

(73) Assignee: Ramsee 1 LLC, New York, NY (US)

( * ) Notice: Subject to any disclaimer, the term of this patent is extended or adjusted under 35 U.S.C. 154(b) by 0 days.

(21) Appl. No.: 19/266,838

(22) Filed: Jul. 11, 2025

(51) Int. Cl.
    *H04L 9/00*          (2022.01)
    *H04L 9/32*          (2006.01)

(52) U.S. Cl.
    CPC .......... *H04L 9/3213* (2013.01); *H04L 9/3226* (2013.01); *H04L 9/3297* (2013.01); *H04L 9/50* (2022.05)

(58) Field of Classification Search
    CPC ... H04L 9/3213; H04L 9/3226; H04L 9/3297; H04L 9/50
    See application file for complete search history.

(56) References Cited

U.S. PATENT DOCUMENTS

| | | | | |
|---|---|---|---|---|
| 2010/0293608 A1* | 11/2010 | Schechter | ............. | H04L 9/3218 |
| | | | | 726/8 |
| 2021/0216646 A1* | 7/2021 | Miller | ................... | G06F 21/604 |
| 2024/0405989 A1* | 12/2024 | Sebbane | ............... | G06F 21/629 |
| 2025/0252270 A1* | 8/2025 | Avusingi | ................ | G06F 40/40 |
| 2025/0259130 A1* | 8/2025 | Jaganathan | ...... | G06Q 10/06398 |

FOREIGN PATENT DOCUMENTS

| | | | | | |
|---|---|---|---|---|---|
| CN | 117150518 A | * | 12/2023 | ........... | G06F 21/602 |
| CN | 120163484 A | * | 6/2025 | | |
| KR | 20240007404 A | * | 1/2024 | ............. | G06Q 50/20 |

* cited by examiner

*Primary Examiner* — Kevin Ayala
(74) *Attorney, Agent, or Firm* — Fay Kaplun & Marcin, LLP

(57) ABSTRACT

A system configured to generate, based on signaling received from an artificial intelligence (AI) system, a truth token comprising a query received by the AI system and an answer to the query generated by the AI system, wherein the query and the answer are recorded on a blockchain of the truth token, distribute the truth token to one or more AI validation nodes, process, based on signaling received from each of the one or more AI validation nodes, validation answers to the query, wherein each of the one or more AI validation nodes generates an individual validation answer, determine, based on the validation answers, the answer is a validated answer and generate a new block for the truth token comprising an indication the answer is validated, wherein the indication is recorded on the blockchain of the truth token.

16 Claims, 8 Drawing Sheets

AI Validator Network 300

Clustering and voting scheme

Blockchain Logging 500

Blockchain of Truth Token 600

Block Diagram 700

800

DECENTRALIZED VALIDATION OF AI-GENERATED RESPONSES VIA BLOCKCHAIN-BASED CONSENSUS

BACKGROUND

Current artificial intelligence (AI) systems are prone to generating inaccurate or entirely fabricated answers, commonly referred to as hallucinations. According to a May 5, 2025 New York Times article, " . . . [w]hile today's A.I. bots are based on complex mathematical systems that learn their skills by analyzing enormous amounts of digital data. They do not—and cannot—decide what is true and what is false. Sometimes, they just make stuff up, a phenomenon some A.I. researchers call hallucinations. On one test, the hallucination rates of newer A.I. systems were as high as 79 percent."

Hallucinations pose substantial risk in domains that require high factual precision, such as law, medicine, and finance. Existing solutions like Reinforcement Learning from Human Feedback (RLHF) are labor-intensive and centralized, leading to scalability concerns, introducing additional costs and potential bias. There is an urgent need for a decentralized and tamper-resistant mechanism to validate AI-generated content.

SUMMARY

Some example embodiments are related to a system having a processor coupled to memory, the processor configured to generate, based on signaling received from an artificial intelligence (AI) system, a truth token comprising a query received by the AI system and an answer to the query generated by the AI system, wherein the query and the answer are recorded on a blockchain of the truth token, distribute the truth token to one or more AI validation nodes, process, based on signaling received from each of the one or more AI validation nodes, validation answers to the query, wherein each of the one or more AI validation nodes generates an individual validation answer, determine, based on the validation answers, the answer is a validated answer and generate a new block for the truth token comprising an indication the answer is validated, wherein the indication is recorded on the blockchain of the truth token.

Other example embodiments are related to a method for generating, based on signaling received from an artificial intelligence (AI) system, a truth token comprising a query received by the AI system and an answer to the query generated by the AI system, wherein the query and the answer are recorded on a blockchain of the truth token, wherein the query and the answer are independently hashed or compressed on the blockchain, distributing the truth token to one or more AI validation nodes, processing, based on signaling received from each of the one or more AI validation nodes, validation answers to the query, wherein each of the one or more AI validation nodes generates an individual validation answer, determining, based on the validation answers, the answer is a validated answer and generating a new block for the truth token comprising an indication the answer is validated, wherein the indication is recorded on the blockchain of the truth token.

Still further example embodiments are related to a non-transitory computer readable storage medium having a set of instructions, wherein, when executed, cause a processor to generate, based on signaling received from an artificial intelligence (AI) system, a truth token comprising a query received by the AI system and an answer to the query generated by the AI system, wherein the query and the answer are recorded on a blockchain of the truth token, distribute the truth token to one or more AI validation nodes, process, based on signaling received from each of the one or more AI validation nodes, validation answers to the query, wherein each of the one or more AI validation nodes generates an individual validation answer, determine, based on the validation answers, the answer is a validated answer and generate a new block for the truth token comprising an indication the answer is validated, wherein the indication is recorded on the blockchain of the truth token.

DETAILED DESCRIPTION

Figure 1:
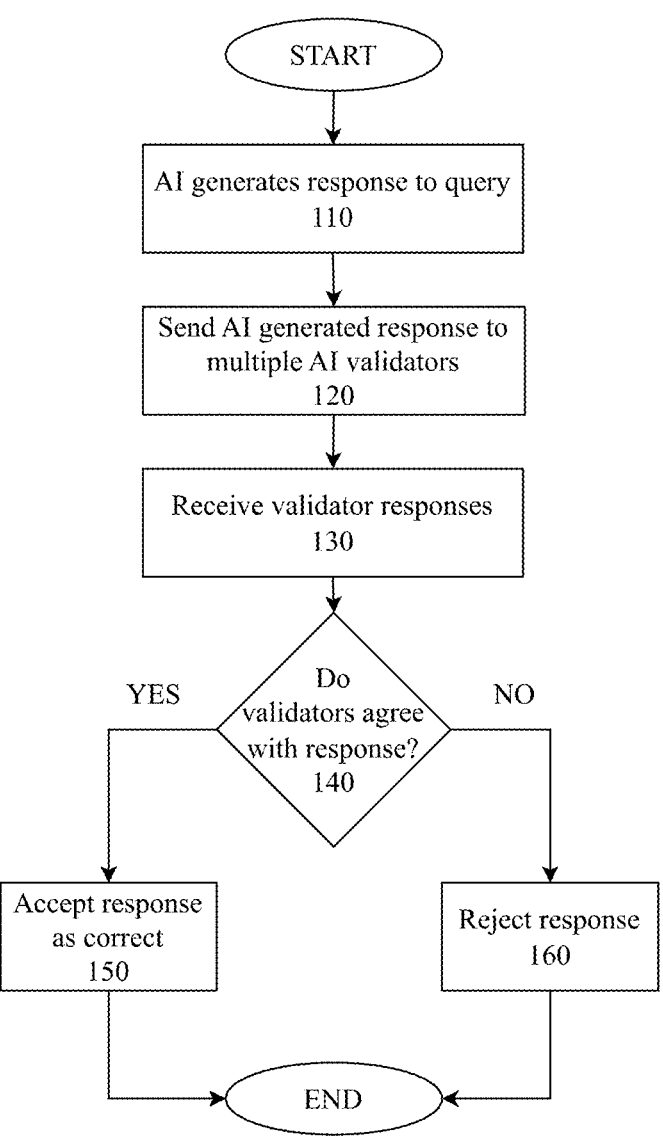
FIG. 1 shows a method that is a general overview of the validation process according to various example embodiments.

The example embodiments may be further understood with reference to the following description and the related appended drawings, wherein like elements are provided with the same reference numerals. The example embodiments relate to the convergence of artificial intelligence validation systems, distributed consensus mechanisms, cryptographic security protocols, and blockchain technology. More specifically, the example embodiments pertain to computer-implemented methods and systems for real-time validation of AI-generated content through decentralized networks employing semantic analysis, cryptographic commitment schemes, consensus algorithms, smart contract automation, and immutable distributed ledger recording. The example embodiments encompass distributed computing architectures, natural language processing validation, machine learning consensus mechanisms, cryptocurrency-based incentive systems, and quantum-resistant cryptographic protocols for AI content verification.

Existing validation methodologies may include confidence scoring but lack decentralized validation. Prior attempts at AI validation include, for example, ensemble methods where multiple AI models generate responses, but these lack cryptographic security and formal consensus mechanisms, blockchain immutability and proper incentive alignment. Another example includes fact-checking application programming interfaces (APIs) that rely on static knowledge bases that become outdated and do not handle novel or reasoning-based queries. A further example includes human-in-the-loop systems using humans as a "Turk" for AI validation, thereby introducing human bias, cost, and latency issues.

The example embodiments leverage the success and immutability of blockchain consensus mechanisms in distributed computing. Blockchain-based models used in decentralized finance (DeFi) and distributed computing have demonstrated that consensus mechanisms and cryptographic logging can create scalable, trustable systems. Yet, these methods have not been applied to real-time AI response validation. The example embodiments address the gap between antiquated remote validation systems and technological convergence. The synergy of AI and distributed ledger technology allows for "truth" to be digitized and confirmed through validation across independent AI validators. Using techniques such as semantic vector comparison, graph clustering, decentralized voting, and blockchain logging, the example embodiments create a safe, more robust future for artificial intelligence.

The example embodiments address issues such as a temporal fairness problem by using cryptographic time-locking to ensure fair, independent response generation. The example embodiments also address semantic similarity challenges by employing advanced vector space analysis and multi-modal semantic clustering. Further, the example embodiments use a consensus mechanism adaptation that includes novel consensus algorithms specifically designed for semantic content validation. The example embodiments also align incentives by using a sophisticated reward mechanisms balancing speed, accuracy, and long-term network health. The system operates on the principle that truth emerges from cryptographically secured consensus among diverse, independent AI validators rather than from a centralized authority or predetermined knowledge sources.

FIG. 1 shows a method that is a general overview of the validation process according to various example embodiments. In 110, an AI model may generate a response to a query by a user. The improvement in validation accuracy may be modeled using consensus theory and the Law of Large Numbers. For example, instead of trusting one AI system that may make mistakes, many different AI "validators" may be used to check the work of the other AI models. Thus, in 120, the AI generated response from 110 may be sent to multiple AI validators. In 130, each validator gives a "vote" on whether an answer is correct, e.g., each AI validator may independently determine a response to the query and confirm the response generated in 110 is correct or indicate the response generated in 110 is incorrect. Each validator may have a "trust score" based on the reliability of the individual validator. This trust score may be used to weight the response of the individual validator.

In 140, the system determines whether the validators agree with the response generated in 110. The system only accepts an answer if enough trusted validators agree. For example, the system may set a threshold for agreement, e.g., 75%, 80%, 90%, etc. of the trusted validators must agree. If the validators agree, in 150, the system accepts the response as correct. However, if the number of validators that agree does not reach the threshold, then in 160, the system rejects the response as not trusted or true.

The principle is based on, for example, a single AI may be wrong 10-20% of the time. However, if there are 10 validators that are each 80-90% accurate, the chance that most of them are wrong at the same time becomes small. Thus, in an example of 25 validators that are 85% accurate, the system error rate drops to about 1 in 100,000. This approach may make the system 1,000 to 10,000 times more accurate than a single AI working alone. Independent errors from multiple sources are much less likely to all happen at once, so the group becomes far more reliable than any individual member.

The example embodiments address the critical problem of AI hallucinations and response validation through a novel distributed cryptographic consensus system that fundamentally transforms how artificial intelligence-generated content is verified and authenticated. The example embodiments introduce a "truth token" architecture enabling real-time, decentralized validation of AI responses through blockchain-based consensus mechanisms.

When a user submits a query to the primary AI system, a unique cryptographic artifact called a "truth token" is created that encapsulates both the original query and the primary AI's response in an encrypted, verifiable format. This truth token serves as the foundation for a distributed validation process that maintains temporal fairness, prevents collusion, and ensures that all AI validators operate on identical input data while generating independent responses.

The technical innovation lies in the integration of several advanced cryptographic and semantic analysis technologies working in concert. The system employs time-locked encryption mechanisms to ensure that validator AIs cannot influence each other's responses, advanced semantic clustering algorithms to identify consensus among semantically similar responses, and blockchain technology to create an immutable audit trail of the validation process. The economic sustainability of the network is maintained through a sophisticated cryptocurrency reward system that incentivizes accurate validation while penalizing malicious or consistently inaccurate validators.

The validation process unfolds through a carefully orchestrated sequence of cryptographic operations, semantic analysis, and consensus determination. After a truth token is distributed to the validator network, each AI node independently decrypts the query component, generates its own response, and encrypts that response to prevent premature comparison. Once all responses are collected, the system performs synchronized decryption and applies advanced semantic similarity analysis to cluster responses by meaning rather than exact textual match. The consensus determination process considers not only the semantic clustering results but also the historical performance and reputation of each validator, creating a weighted consensus that becomes more accurate over time.

The blockchain integration serves multiple critical functions beyond simple record-keeping. Each validation session results in a cryptographic hash that captures the query, all validator responses, consensus results, and metadata in an immutable format that can be independently verified. Smart contracts automate the reward distribution process, ensuring that validators are compensated fairly and immediately based on their contribution to consensus accuracy. The system also implements governance mechanisms that allow the validator network to evolve its consensus parameters and validation criteria through decentralized autonomous organization (DAO) processes.

The example embodiments provide real-time validation without human intervention while maintaining cryptographic guarantees of fairness and immutability. The system scales horizontally by adding more validator nodes, adapts to new domains through specialized validator pools, and maintains security through economic incentives rather than centralized control. The result is a validation system that becomes more accurate and resilient as it grows, creating a network effect that benefits all participants while providing users with cryptographically verifiable confidence in AI-generated responses.

In some example embodiments, the validation system may be configured to operate in an isolated, standalone environment. For example, a single user may deploy a minimal validator network using local or lightweight AI models on personal hardware (e.g., a laptop, edge device, or mobile hardware). In such configurations, the blockchain records may be maintained on a local or private ledger, and validator responses may be generated by open-source models or limited-use inference engines. This setup supports secure, resource-conscious AI validation for personal or enterprise-internal applications without requiring external validator networks. The validator reward system (as described in greater detail below) may be simulated or internalized in such deployments.

The following description describes components of the system architecture, each contributing functionality to the overall validation process. These components work together to transform a simple AI query into a cryptographically validated, blockchain-recorded response that users can trust for critical applications requiring high factual accuracy. The system does not require all the components described herein as some implementations may use less than the described components.

Figure 2:
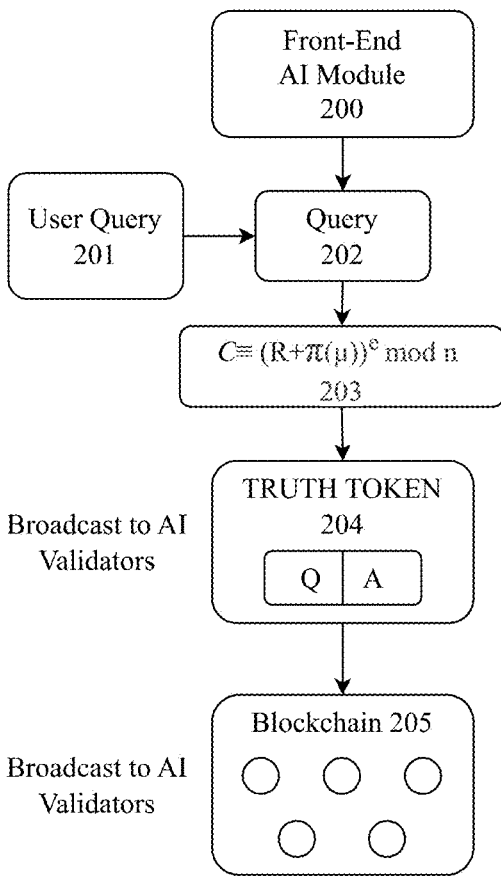
FIG. 2 shows a front-end AI module according to various example embodiments.

FIG. 2 shows a front-end AI module 200 according to various example embodiments. The front-end AI module may receive a user input query 201 that is formatted into a machine readable query 202 and generates a primary response 203, e.g., the operations associated with 110 of FIG. 1. The prompt and the response ("Query" and "Answer") may be independently hashed and compressed.

In some example embodiments, the system may encrypt or compress the AI-generated response using the formula $C=(R+\Pi(\mu))^e \bmod n$, wherein R is a random value, $\Pi(\mu)$ is a hashed or transformed version of the query, e is a public exponent, and n is the modulus. This structure introduces non-determinism into the response token and supports tamper resistance and validator fairness by obscuring the contents until a defined reveal time. However, the example embodiments are not limited to this type of hashing or compression, it is only provided as one example.

The query (Q) and the answer (A) may be packaged into a token 204 (e.g., "truth token"). The generated truth token 204 may then be delivered to AI validator nodes on the blockchain 205.

Figure 3:
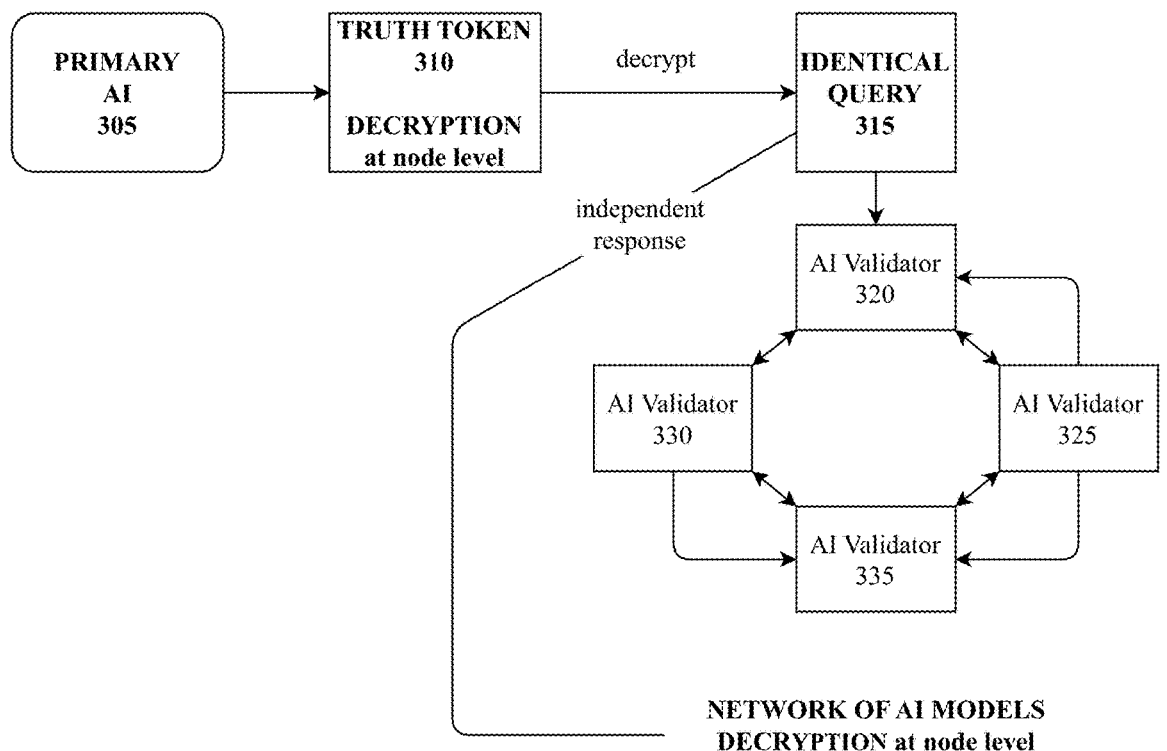
FIG. 3 shows an example AI validator network according to various example embodiments.

FIG. 3 shows an example AI validator network 300 according to various example embodiments. As shown in FIG. 3, the primary AI system 305 generates a response to a query and a truth token 310 having the query and answer as described above. The truth token 310 may be sent to each AI validator of the AI validator network 300. In this example, the AI validator network 300 comprises four (4) AI validators 320-335. However, an AI validator network may include any number of AI validators and as described above, more AI validators may result in more confident results.

Each AI validator 320-335 may receive the truth token 310 and individually decrypt the query and answer and run an identical query 315 through its AI, e.g., large language model (LLM), classifier model, deep learning model, machine learning model, etc. After decryption, each AI validator 320-335 may generate their own independent response to the identical query. A diversity in models may ensure robustness and reduce systemic bias. In some example embodiments, the AI validators 320-335 may operate in federated environments and execute on separate infrastructure, including edge devices, GPUs, or decentralized computing networks. The AI validators may operate using different model architectures or training data sets to reduce systemic bias.

Each AI validator may encrypt its answer to ensure fairness and prevent premature comparison. For example, the encryption may be done in the same manner as the original encryption by the primary AI system 305, e.g., according to $C=(R+\Pi(\mu))^e \bmod n$. Thus, each AI validators answer is hidden inside a digital lockbox. The randomness parameter $(\Pi(\mu))$ ensures that each message is unique. The answer may only be opened after a reveal time.

In other example embodiments, a more robust encryption may be employed by the AI validators. For example, an elliptic curve encryption may be used, e.g., based on the formula: $C=(kG, R+kP+\lambda\cdot\theta)$. This may add further protection (or locking) using elliptic curve math, making it harder to cheat or guess the answer early. In other example embodiments, the system may support lattice-based encryption for quantum resistance. Thus, the example embodiments may support any type of encryption that protects the queries/answers.

After the encryption expires, each AI authenticator 320-335 may decrypt the peer responses for comparison. Hash representations of the answer generated by each AI validator 320-335 may be compared to the original "A" generated by the primary AI 305 that is encoded in the truth token 310. For example, the answers may be converted into a list of alpha numeric characters. The system then checks how closely each AI validator 320-335 encoded answer matches the A component of the truth token 310. The system may compare a similarity of the alpha numeric characters of the original "A" to the answer generated by each of the AI authenticators 320-335 to determine a similarity metric for the answers of each of the AI authenticators 320-335. If the similarity metric satisfies a threshold, the system may declare an answer of an AI authenticator to match the answer of the primary AI 305. The threshold for the similarity metric may be variable based on any number of factors, e.g., the type of query, the risk tolerance of the user, the history of the particular AI authenticator. Thus, the similarity threshold may be individual for each AI authenticators 320-335 or may be the same for all AI authenticators 320-335 for a particular query.

In some example embodiments, the similarity metric may be calculated based on the formula $\sigma_{ij}=(v_i \cdot v_j)/(\|v_i\| \|v_j\|)$ to compute the cosine similarity between two AI-generated responses, represented as vector embeddings. In this formula, $\sigma_{ij}$ is the similarity score between validator i and validator j, $v_i$ and $v_j$ are vector representations (e.g., from embeddings) of their respective responses, $v_i \cdot v_j$ is the dot product of the vectors, and $\|v_i\|$ and $\|v_j\|$ are the magnitudes (L2 norms) of those vectors. The resulting score ranges from $-1$ to 1 and reflects the semantic similarity between two answers. This score may be used to cluster validator responses and determine whether consensus has been reached in favor of the original answer.

In some example embodiments, the system may uses the cosine similarity to assess semantic alignment among AI-generated responses. The similarity score is calculated as $\sigma_{ij}=(v_i \cdot v_j)/(\|v_i\| \|v_j\|)$, where $v_i$ and $v_j$ are embeddings of the AI-generated responses. A high similarity score indicates semantic agreement and may be used to determine validator consensus or to drive a majority clustering algorithm.

Figure 4:
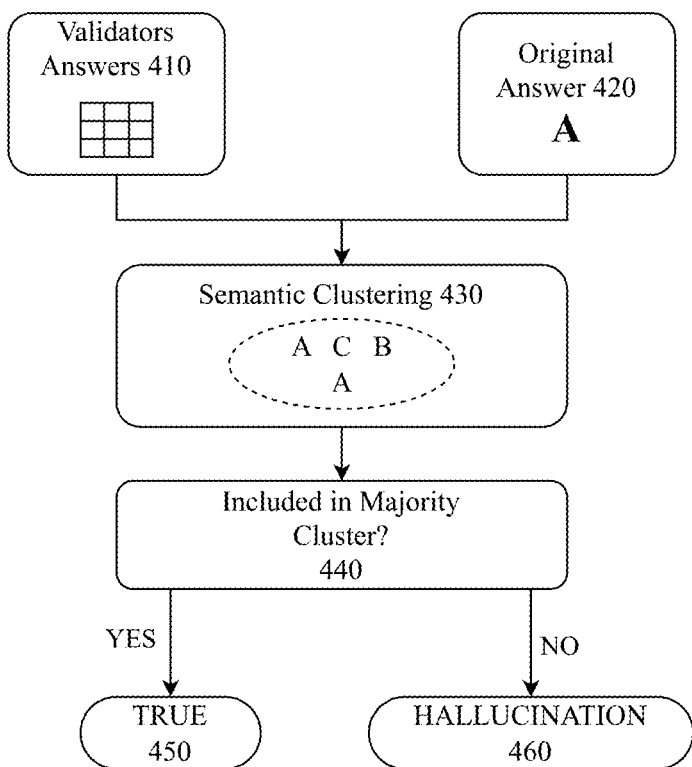
FIG. 4 shows a block diagram of a clustering and voting scheme according to various example embodiments.

FIG. 4 shows a block diagram of a clustering and voting scheme 400 according to various example embodiments. In FIG. 4, the answers 410 of each of the AI validators (e.g., AI validators 320-335) are shown along with the original answer 420. The system may then apply semantic clustering 430 algorithms (e.g., Louvain, DBSCAN) to group similar components of the original tokenized answer 420 and the AI validator answers 410. The relative accuracy of the original answer 420 may be measured against each individual AI validator answer.

In some example embodiments, the semantic clustering may be based on the answers 410 and 420 being converted into a list of alpha numeric characters. The semantic clustering algorithm may then determine how closely each AI validator answer 410 matches the original answer 420 included in the truth token. Consensus as to whether the original answer 420 is "True" 450 or a "Hallucination" 460 may be based on whether the original answer 420 is included in a majority cluster 440, e.g., if $|C| \geq \theta \cdot N$, the original answer is in the majority cluster, where C is a number of the original answer 420 and AI validator answers 410 in a cluster, $\theta$ is a threshold and N is the total number of the original answer 420 and AI validator answers 410. Thus, if enough of the AI validators answers 410 agree with the original answer 420, the original answer is accepted as true. The threshold ($\theta$) may be adaptive, e.g., based on an AI validator count, a type of the query, a category of the query, a difficulty of the validation the historical reliability of the AI validators, etc.

Figure 5:
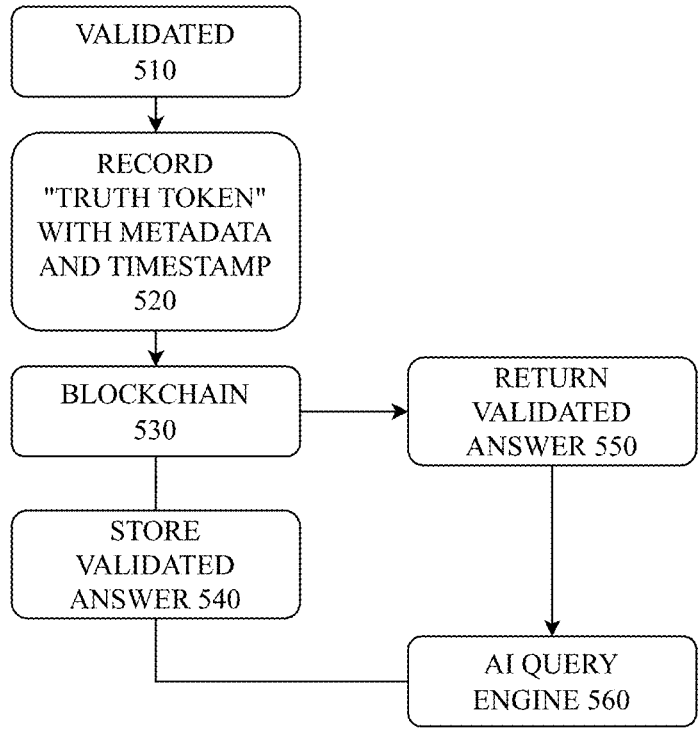
FIG. 5 shows an example method for blockchain logging according to various example embodiments.
Figure 6:
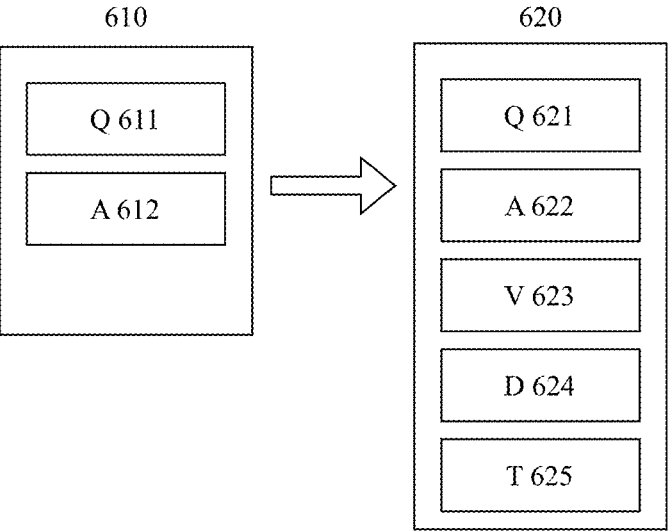
FIG. 6 shows an example blockchain of a truth token according to various example embodiments.

FIG. 5 shows an example method 500 for blockchain logging according to various example embodiments. FIG. 6 shows an example blockchain 600 of the truth token according to various example embodiments. The method 500 is described with reference to an example blockchain 600 of the truth token of FIG. 6.

As described above, the system originally generates the truth token 610 when a user query is submitted to the front end AI module. The truth token 610 may include the user query 611 and the answer 612 generated by the front end AI module. The truth token 610 may also include other information, e.g., an identification of the front end AI module that generated the answer 612, a timestamp of when the original answer was generated, etc. As described above, this truth token 610 may be broadcast to the AI validators to validate the answer 612 generated by the front end AI module. This process was described in detail above and will not be described again for brevity purposes. The method 500 is related to a scenario where the original answer 612 is validated by the AI validators as true, e.g., 450 of FIG. 4. This is shown as 510 in FIG. 5.

If the original answer 612 is validated 510 as true, in 520, the system may record additional blocks on the blockchain 600 of the truth token. For example, the original encrypted information from the original truth token may be recoded on the blockchain 600 (e.g., Q 621 and A 622) with additional metadata and a timestamp. The metadata may include an indication that the answer has been validated (e.g., V 623) and details of the validation (e.g., D 624). The details of the validation may include, for example, how many AI validators the original answer was sent to, how many AI validators agreed with the answer, how many AI validators disagreed with the answer, an identification or the AI validators that agreed or disagreed, a historical accuracy of the AI validators, etc. In the example of FIG. 6, the details (D624) is shown as a single field in the block of the truth token 620, but it may include multiple fields. The block may also include a timestamp (e.g., T 625) indicating a date/time of when the answer was validated, e.g., a similar query may result in different answers as time/circumstances change.

In 530, the blockchain 600 of the truth token (e.g., including the information from the block 620) may be encoded. In 540, the system may store the validated answer. In 550, a message is sent to the original AI query engine 560 (e.g., the front end AI module) confirming the validity of the answer and identifying the block on the chain that contains the validation information. For example, the blockchain 600 of the truth token may be hashed according to H=SHA3_256 (Q||A||M||T), where H is the hash, SHA_256 is a Secure Hash Algorithm 3, Q is the query, A is the answer, M is the validation details and t is the timestamp. It should be understood that this is just one example of a hashing algorithm and other types of hashing algorithms may be used.

This process creates a digital fingerprint of the interaction that is immutable, e.g., the result cannot be later changed. In some example embodiments, decentralized oracles may be used to timestamp and record the truth token onto public ledgers. If a change were attempted to the information in the block 620, the hash would be different and indicate that there were changes.

Figure 7:
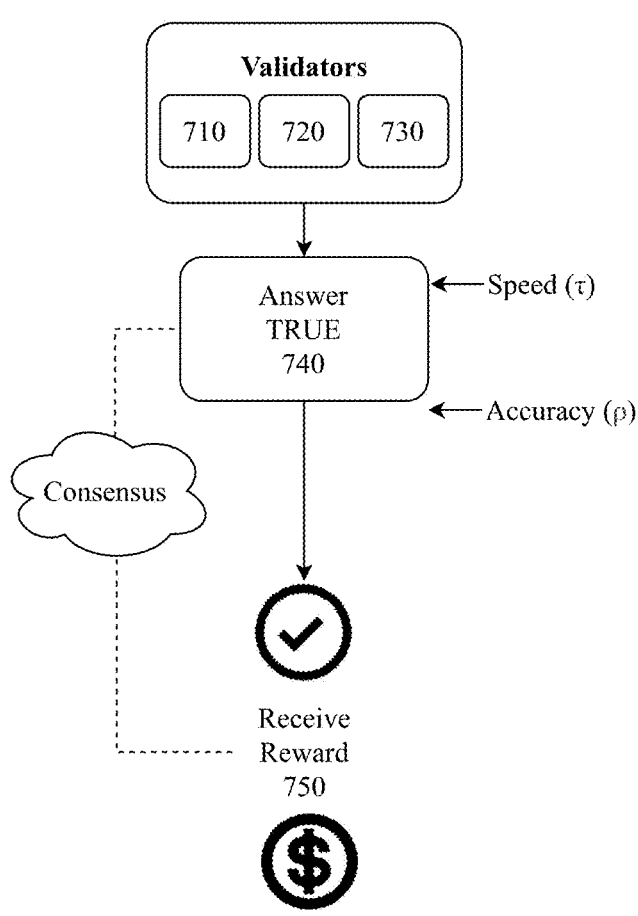
FIG. 7 shows a block diagram for rewarding AI validators according to various example embodiments.

FIG. 7 shows a block diagram 700 for rewarding AI validators according to various example embodiments. As described above, in some example embodiments, the AI validators may be rewarded for acting as validators to incentivize AI systems to become validators and to incentivize the validators to timely and accurately perform validation. The reward may be, for example, a cryptocurrency token that may be mined during the consensus process and rewarded to AI validator nodes.

The reward to each individual AI validator node may be based on a formula such as:

$$R_k = B \cdot \frac{(\tau_k \wedge \beta \cdot \rho_k \wedge \gamma)}{\sum \tau_i \wedge \beta \cdot \rho_i \wedge \gamma}$$

where, $R_k$=Reward (cryptocurrency) that a validator k receives,

B=Total reward pool being distributed $\tau_k$=Speed score for validator k (e.g., how fast the validator responded)

$\rho_k$=Accuracy score for validator k (e.g., how correct the validator was)

$\beta$=Speed importance factor (e.g., higher $\beta$=speed matters more)

$\gamma$=Accuracy importance factor (e.g., higher $\gamma$=accuracy matters more), and $\Sigma(\tau_i \hat{} \beta \cdot \rho_i \hat{} \gamma)$=Sum of all validators' combined performance scores.

In some example embodiments, the system may support multiple mechanisms for generating and distributing validator rewards. For example, in one model, the system may include a native token generation process in which new reward tokens are algorithmically minted during the validation consensus cycle, e.g., in a similar manner to cryptocurrency mining protocols. Alternatively, the reward pool may be pre-funded by an external source such as a smart contract wallet, DAO treasury, enterprise sponsor, or ecosystem foundation. A usage-based model may also be implemented, wherein applications or users submitting validation requests contribute transaction fees to fund the validator pool. Reward logic may be governed dynamically by smart contracts, allowing adjustments based on validator network load, token supply, or application-specific parameters. These reward pathways are non-limiting and may be implemented in hybrid form to support validator engagement and long-term network sustainability.

In some example embodiments, the role of blockchain may be extended beyond transactional or ownership records to serve as a decentralized infrastructure for validating the correctness of AI-generated information. The system enables multiple validator AI nodes to independently respond to a shared query and generate their own answers. Using semantic similarity scoring and clustering algorithms, the system determines whether the original answer generated by the front-end AI aligns with the majority of validator responses. The result of this consensus—whether the original answer is accepted or rejected—is then recorded immutably on a blockchain. In this configuration, the blockchain functions as a truth consensus layer, providing a cryptographically verifiable audit trail that reflects the outcome of distributed AI validation. This application of blockchain supports integrity, traceability, and transparency in AI output verification and may be used to establish proof-of-truth in decentralized computing environments.

Thus, as shown in FIG. 7, each validator performs the validation as described above and if the validator generates a "true" response 740, the validator is scored. Each individual validator 710-730 (e.g., validator k) may be scored as follows: take validator k's speed ($\tau_k$) and raise it to power $\beta$, take validator k's accuracy ($\rho_k$) and raise it to power $\gamma$, multiply these together: $\tau_k^{\beta} \times \rho_k^{\gamma}$ to result in validator k's performance score. The variables in calculating the validator performance score are the same as described above.

Next, a total performance of all validators may be performed. This means that the performance score for all validators 710-730 are calculated and summed, e.g., $\Sigma(\tau_i^{\beta} \cdot \rho_i^{\gamma})$. Each validator's share is then determined by dividing the individual validator's score by the total performance score of all the validators and multiplying it by the total reward pool (B). Each validator may then receive their reward 750.

This allows for a fair distribution of the rewards where better performers are provided with larger rewards. It allows the system to balance incentives, e.g., the values of $\beta$ and y may be adjusted to reward speed or accuracy as needed. Also, all rewards are distributed because the sum awarded to the validators adds up to B. This also makes the system competitive by encouraging validators to be fast and accurate.

In some example embodiments, the system may implement a compression formula that is a smart space-saving system for the blockchain. For example, when the system needs to store a new answer or piece of data, the system first compares the "new" data to previously stored items to see how similar they are. This may be performed using a similarity score. If the new content is different enough from the data that has already been stored (below the similarity threshold ¿), the new information is stored. However, if the new data is very similar to data already on the blockchain, instead of wasting space by storing the full duplicate information, the system may create a reference pointer. This reference point may indicate that the data is similar to data previously stored at location $\tau_j$, but with these specific differences ($\Delta$). This approach dramatically reduces the storage requirements for a distributed ledger by avoiding redundant data while still preserving all the unique information. A simple example may be something such as, instead of storing "The capital of France is Paris" a thousand times, it is stored once and then may be referenced with modifications such as "change France to Germany and Paris to Berlin," for similar future queries.

This compression may be expressed as:

$$S(i)=\text{emit}(\delta_i) \text{ if } m(i,j)<\varepsilon; \text{ else emit}(\text{ref}(\tau_j,\Delta))$$

where, S(i) is a similarity score,
$\delta_i$ is the new data
$\varepsilon$ is the similarity threshold,
$\tau_j$ is the location of similar data, and
$\Delta$ is the changes between $\delta_i$ and the similar data.

In some example embodiments, a validation toggle may be used for the queries. For example, some user queries may be creative or subjective queries (e.g., jokes, art, philosophy) for which there are no "true" answers, e.g., 10 best movies of the 2000's. In such a case a user may disable validation to save computing resources and latency. This can be triggered manually or programmatically based on content-type detection algorithms.

The system is resistant to Sybil attacks due to reliance on a historical validator accuracy ($\rho$) and latency performance ($\tau$). Validators with poor reputation contribute less to consensus and receive reduced rewards. Encrypted synchronization may uses timestamp locks to prevent early reveals. The decentralized architecture eliminates single points of failure, improving robustness and fault tolerance. This allows the system to build trust in AI by creating an ecosystem where multiple AIs independently generate answers, hide their responses until a set time, and then compare them to see which ones are similar in meaning. If most of the AIs agree, the answer is accepted. Everything is recorded on a blockchain so it cannot be faked or changed later. AIs that agree with the consensus quickly and often are rewarded with cryptocurrency.

Figure 8:
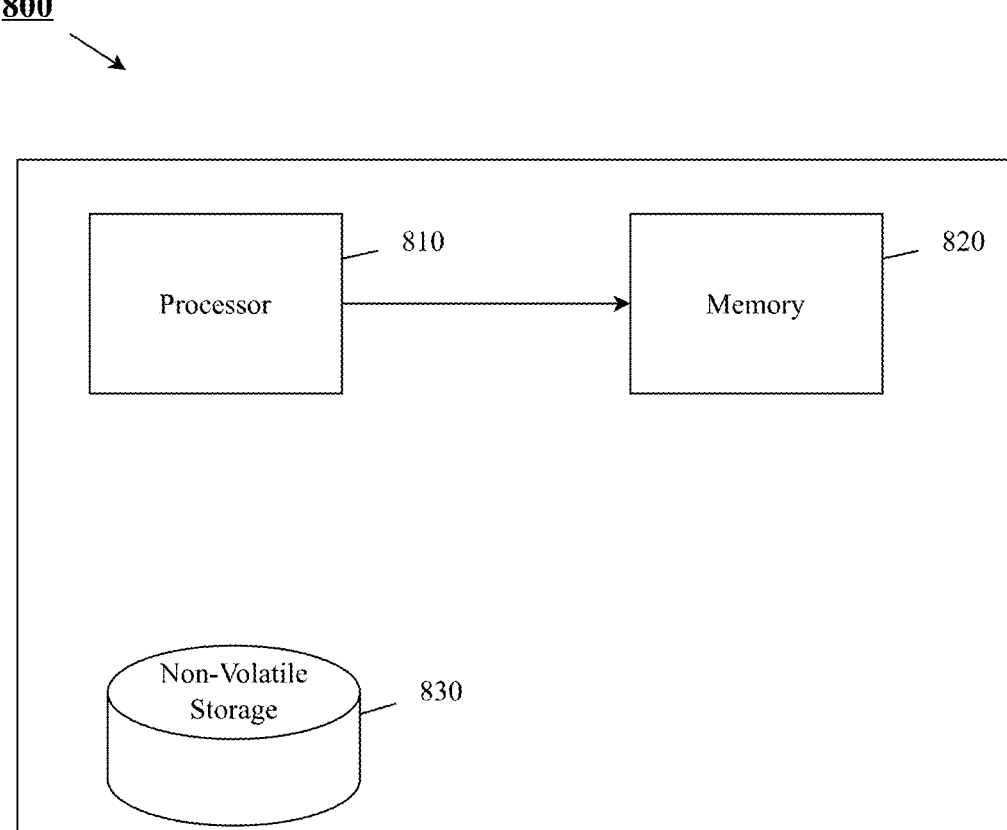
FIG. 8 shows a block diagram of a special purpose computer system on which various functions discussed herein may be practiced according to various example embodiments.

FIG. 8 shows an illustrative implementation of a computer system 800 that may be used in connection with any of the embodiments of the disclosure provided herein. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

Those skilled in the art will understand that the above-described example embodiments may be implemented in any suitable software or hardware configuration or combination thereof. An example hardware platform for implementing the example embodiments may include, for example, an Intel x86 based platform with compatible operating system, a Windows OS, a Mac platform and MAC OS, a mobile device having an operating system such as iOS, Android, etc. The example embodiments described above may be embodied as a program containing lines of code stored on a non-transitory computer readable storage medium that, when compiled, may be executed on a processor or microprocessor.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

What is claimed:

1. A system, comprising:
a processor coupled to memory, the processor configured to:
encrypt a query received by an artificial intelligence (AI) system and an answer to the query generated by the AI system;
generate a truth token comprising the encrypted query and answer, wherein the encrypted query and answer are recorded on a blockchain of the truth token;
distribute the truth token to one or more AI validation nodes;
receive, from each of the one or more AI validation nodes, validation answers to the query, wherein each of the one or more AI validation nodes generates an individual validation answer and wherein each of the validation answers is encrypted with a reveal time;
decrypt each of the validation answers when a corresponding reveal time expires;
determine, based on the validation answers, an answer is a validated answer, wherein the answer is a validated answer when a consensus parameter for the answer satisfies a predetermined threshold, wherein the consensus parameter is based on agreement among the one or more validation nodes on the answer;
generate a new block for the truth token comprising an indication the answer is validated, wherein the indication is recorded on the blockchain of the truth token;
determine a reward for each of the one or more validation nodes;
determine a performance score for each of the one or more AI validation nodes;
determine an overall performance score for all of the one or more AI validation nodes; and
distribute the reward among the one or more AI validation nodes based on a comparison of the performance score of each of the one or more AI validation nodes and the overall performance score.

2. The system of claim 1, wherein the one or more validation nodes comprise a federated environment, wherein each of the one or more validation nodes execute on a separate computing infrastructure.

3. The system of claim 1, wherein, to determine the answer is a validated answer, the processor is further configured to:

determine a similarity metric between each validation answer and the answer; and
determine a validation answer matches the answer when the similarity metric exceeds a threshold.

4. The system of claim 3, wherein determining the similarity metric comprises the processor being configured to:
convert the answer and the validation answer into a list of alpha numeric characters.

5. The system of claim 3, wherein the threshold is based on one of the query or the AI validation node.

6. The system of claim 1, wherein determining the answer is a validated answer comprises the processor being configured to:
cluster the validation answers into clusters comprising a first cluster than includes a number of validation answers that match the answer and a second cluster that includes a number of validation answers that do not match the answer; and
determine the number of validation answers in the first cluster satisfies a threshold compared to a sum of the number of validation answers in the first cluster and the number of validation answers in the second cluster.

7. The system of claim 6, wherein the threshold is based on a number of the one or more validation nodes, a type of the query, a category of the query, a difficulty of the validation or a historical accuracy of the one or more validation nodes.

8. The system of claim 1, wherein the indication that the answer is validated further comprises details of validation, wherein the details of validation are recorded on the blockchain of the truth token.

9. The system of claim 8, wherein the details of validation include one or more of (a) a number of AI validation nodes the answer was sent to, (b) a number of AI validation nodes that agreed with the answer, (c) a number of AI validation nodes that disagreed with the answer, (d) an identification of the one or more AI validation nodes, or (e) a historical accuracy of the one or more AI validation nodes.

10. The system of claim 1, wherein the indication that the answer is validated further comprises a timestamp of when the answer was validated, wherein the timestamp is recorded on the blockchain of the truth token.

11. The system of claim 1, wherein the performance score for each of the one or more AI validation nodes is based on a speed with which an AI validation node generated a validation answer or an accuracy of the validation answer generated by the AI validation node.

12. The system of claim 11, wherein the speed or accuracy is weighted with respect to the performance score for the AI validation node.

13. The system of claim 1, wherein the reward comprises cryptocurrency.

14. The system of claim 1, wherein the processor is further configured to:
determine a similarity between the validated answer and a previously stored validated answer;
when the similarity is less than a threshold, store the validated answer; and
when the similarity exceeds a threshold, storing a pointer to the previously stored validated answer and differences between the validated answer and the previously stored validated answer.

15. A method, comprising:
encrypting a query received by an artificial intelligence (AI) system and an answer to the query generated by the AI system;

generating a truth token comprising the encrypted query and answer, wherein the encrypted query and answer are recorded on a blockchain of the truth token, wherein the encrypted query and answer are independently hashed or compressed on the blockchain;

distributing the truth token to one or more AI validation nodes;

receiving, from each of the one or more AI validation nodes, validation answers to the query, wherein each of the one or more AI validation nodes generates an individual validation answer and wherein each of the validation answers is encrypted with a reveal time;

decrypting each of the validation answers when a corresponding reveal time expires;

determining, based on the validation answers, an answer is a validated answer, wherein the answer is a validated answer when a consensus parameter for the answer satisfies a predetermined threshold, wherein the consensus parameter is based on agreement among the one or more validation nodes on the answer;

generating a new block for the truth token comprising an indication the answer is validated, wherein the indication is recorded on the blockchain of the truth token;

determining a similarity between the validated answer and a previously stored validated answer;

when the similarity is less than a threshold, storing the validated answer; and when the similarity exceeds a threshold, storing a pointer to the previously stored validated answer and differences between the validated answer and the previously stored validated answer.

16. A non-transitory computer readable storage medium comprising a set of instructions, wherein, when executed, cause a processor to:

encrypt a query received by an artificial intelligence (AI) system and an answer to the query generated by the AI system;

generate a truth token comprising the encrypted query and answer, wherein the encrypted query and the answer are recorded on a blockchain of the truth token;

distribute the truth token to one or more AI validation nodes;

receive, from each of the one or more AI validation nodes, validation answers to the query, wherein each of the one or more AI validation nodes generates an individual validation answer and wherein each of the validation answers is encrypted with a reveal time;

decrypt each of the validation answers when a corresponding reveal time expires;

determine, based on the validation answers, an answer is a validated answer, wherein the answer is a validated answer when a consensus parameter for the answer satisfies a predetermined threshold, wherein the consensus parameter is based on agreement among the one or more validation nodes on the answer;

generate a new block for the truth token comprising an indication the answer is validated, wherein the indication is recorded on the blockchain of the truth token;

determine a similarity between the validated answer and a previously stored validated answer;

when the similarity is less than a threshold, store the validated answer; and when the similarity exceeds a threshold, store a pointer to the previously stored validated answer and differences between the validated answer and the previously stored validated answer.

\* \* \* \* \*